(12) United States Patent
Chuong et al.

(10) Patent No.: US 10,718,270 B2
(45) Date of Patent: Jul. 21, 2020

(54) HYDROSTATIC NON-CONTACT SEAL WITH DUAL MATERIAL

(71) Applicant: United Technologies Corporation, Farmington, CT (US)

(72) Inventors: Conway Chuong, Manchester, CT (US); Tara L. D'Ambruoso, Oxford, CT (US); Michael DiFrancesco, Waterbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 225 days.

(21) Appl. No.: 15/623,462

(22) Filed: Jun. 15, 2017

(65) Prior Publication Data

US 2018/0363562 A1 Dec. 20, 2018

(51) Int. Cl.
*F02C 7/28* (2006.01)
*F01D 11/02* (2006.01)
(Continued)

(52) U.S. Cl.
CPC .............. *F02C 7/28* (2013.01); *F01D 11/025* (2013.01); *F01D 25/04* (2013.01); *F16J 15/442* (2013.01); *F01D 11/001* (2013.01); *F01D 11/02* (2013.01); *F05D 2230/237* (2013.01); *F05D 2240/55* (2013.01); *F05D 2300/121* (2013.01); *F05D 2300/522* (2013.01)

(58) Field of Classification Search
CPC ........ F02C 7/28; F01D 11/025; F01D 11/001; F01D 11/02; F16J 15/442; F05D 2240/55
See application file for complete search history.

(56) References Cited

U.S. PATENT DOCUMENTS

| 4,017,088 A | 4/1977 | Lerjen |
| 7,216,871 B1 * | 5/2007 | Datta ...................... F01D 11/02 |
| | | 277/411 |

(Continued)

FOREIGN PATENT DOCUMENTS

| CA | 2403664 A1 | 10/2001 |
| CA | 2536362 A1 | 1/2005 |

(Continued)

OTHER PUBLICATIONS

EPO Search Report dated Jan. 30, 2019 for Patent Application No. 18167355.9.
Office action for EP18167355.9 dated Feb. 14, 2020.

*Primary Examiner* — Joseph J Dallo
*Assistant Examiner* — Kurt Philip Liethen
(74) *Attorney, Agent, or Firm* — Getz Balich LLC

(57) ABSTRACT

A non-contact seal assembly is provided. The non-contact seal assembly includes a plurality of seal shoes arranged about a centerline in an annular array, the seal shoes including a first seal shoe extending axially along the centerline between a first shoe end and a second shoe end; a seal base circumscribing the annular array of the seal shoes; and a plurality of spring elements, each of the spring elements radially between and connecting a respective one of the seal shoes with the seal base, where the seal base and the plurality of spring elements are formed of a first material and the plurality of seal shoes are formed of a second material, where the first and second materials are joined together and the second material has a density lower than the first material.

20 Claims, 5 Drawing Sheets

(51) Int. Cl.
    *F16J 15/44*         (2006.01)
    *F01D 25/04*         (2006.01)
    *F01D 11/00*         (2006.01)

(56) References Cited

U.S. PATENT DOCUMENTS

| | | | |
|---|---|---|---|
| 7,410,173 | B2 | 8/2008 | Justak |
| 7,896,352 | B2 | 3/2011 | Justak |
| 8,002,285 | B2 | 8/2011 | Justak |
| 8,172,232 | B2 | 5/2012 | Justak |
| 8,641,045 | B2 | 2/2014 | Justak |
| 8,919,781 | B2* | 12/2014 | Justak ............... F01D 11/025 277/411 |
| 9,045,994 | B2 | 6/2015 | Bidkar et al. |
| 9,115,810 | B2 | 8/2015 | Bidkar et al. |
| 9,145,785 | B2 | 9/2015 | Bidkar et al. |
| 9,587,746 | B2 | 3/2017 | Bidkar et al. |
| 2003/0080513 | A1 | 5/2003 | Kirby, III et al. |
| 2014/0008871 | A1 | 1/2014 | Bidkar et al. |
| 2014/0119912 | A1* | 5/2014 | Bidkar ............... F01D 11/02 415/229 |
| 2016/0010480 | A1 | 1/2016 | Bidkar |
| 2016/0069269 | A1 | 3/2016 | Hyland et al. |
| 2016/0102570 | A1* | 4/2016 | Wilson ............... F16F 15/06 277/411 |
| 2016/0109025 | A1* | 4/2016 | McCaffrey ......... F01D 11/025 277/411 |
| 2017/0009596 | A1 | 1/2017 | Schwarz et al. |
| 2017/0211406 | A1 | 7/2017 | Peters |
| 2018/0058240 | A1 | 3/2018 | Chuong et al. |

FOREIGN PATENT DOCUMENTS

| | | |
|---|---|---|
| CA | 2675597 A1 | 8/2008 |
| DE | 426658 C | 3/1926 |
| DE | 19735932 C1 | 2/1999 |
| EP | 1942294 A1 | 7/2008 |
| EP | 2137383 A1 | 12/2009 |
| EP | 2279364 A1 | 2/2011 |
| EP | 2286119 A1 | 2/2011 |
| EP | 2299062 A1 | 3/2011 |
| EP | 2665897 A1 | 11/2013 |
| JP | S61108808 A | 5/1986 |
| WO | 2014150825 A1 | 9/2014 |

* cited by examiner

HYDROSTATIC NON-CONTACT SEAL WITH DUAL MATERIAL

This invention was made with government support under Contract No. FA8626-16-C-2139 awarded by the United States Air Force. The government may have certain rights in the invention.

BACKGROUND OF THE INVENTION

1. Technical Field

The present disclosure relates generally to hydrostatic non-contact seals. More particularly, the disclosure relates to hydrostatic non-contact seals that use more than one material.

2. Background Information

Rotational equipment typically includes one or more seal assemblies for sealing gaps between rotors and stators. A typical seal assembly includes a contact seal with a seal element such as a knife edge seal that engages a seal land. Such a contact seal, however, can generate a significant quantity of heat which can reduce efficiency of the rotational equipment as well as subject other components of the rotational equipment to high temperatures and internal stresses. To accommodate the high temperatures and stresses, certain components of the rotational equipment may be constructed from specialty high temperature materials, which can significantly increase the manufacturing and servicing costs as well as the mass of the rotational equipment.

It would be desirable to reduce the mass of the seal to reduce overall engine weight, and to better optimize the vibrational response of the seal system.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a non-contact seal assembly, having a plurality of seal shoes arranged about a centerline in an annular array, the seal shoes including a first seal shoe extending axially along the centerline between a first shoe end and a second shoe end. The non-contact seal assembly may comprise a seal base circumscribing the annular array of the seal shoes. The non-contact seal assembly may further comprise a plurality of spring elements, each of the spring elements radially between and connecting a respective one of the seal shoes with the seal base. The seal base and the plurality of spring elements may be formed of a first material and the plurality of seal shoes are formed of a second material, where the first and second materials are joined together and the second material has a density lower than the first material.

The first material and the second material may be joined by a braze.

The first material and the second material may be joined by a weld.

The first material may comprise nickel alloy.

The second material may comprise one of cobalt alloy or aluminum.

The first seal shoe may extend circumferentially, at the first shoe end, between a first shoe side and a second shoe side for a seal shoe length.

The seal shoes may collectively form a substantially annular end surface at the second shoe end.

According to another aspect of the present disclosure, a non-contact seal assembly is provided. The non-contact seal assembly may provide a plurality of seal shoes arranged about a centerline in an annular array, the seal shoes including a first seal shoe extending axially along the centerline between a first shoe end and a second shoe end. The non-contact seal assembly may comprise a seal base circumscribing the annular array of the seal shoes. The non-contact seal assembly may further comprise a plurality of spring elements, each of the spring elements radially between and connecting a respective one of the seal shoes with the seal base. The seal base and the plurality of spring elements may be formed of a first material and the plurality of seal shoes are formed of a second material, where the first and second materials are joined together and the first and second materials are different metallic materials.

The first material and the second material may be joined by a braze.

The first material and the second material may be joined by a weld.

The first material may comprise nickel alloy.

The second material may comprise one of cobalt alloy or aluminum.

According to another aspect of the present disclosure, an assembly for rotational equipment with an axial centerline is provided. The assembly may comprise a stator structure. The assembly may further comprise a rotor structure. The assembly may comprise a seal assembly configured to substantially seal an annular gap between the stator structure and the rotor structure, the seal assembly comprising a hydrostatic non-contact seal device including a plurality of seal shoes, a seal base and a plurality of spring elements. The seal shoes may be arranged about a centerline in an annular array, the seal shoes sealingly engaging the rotor structure and including a first seal shoe extending axially along the centerline between a first shoe end and a second shoe end. The seal base may circumscribe the annular array of the seal shoes, the seal base mounted with the stator structure. The seal base and the plurality of spring elements may be formed of a first material and the plurality of seal shoes are formed of a second material, where the first and second materials are joined together and the first and second materials are different materials.

The first material and the second material may be joined by a braze.

The first material and the second material may be joined by a weld.

The first material may comprise nickel alloy.

The second material may comprise one of cobalt alloy or aluminum.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

Figure 1:
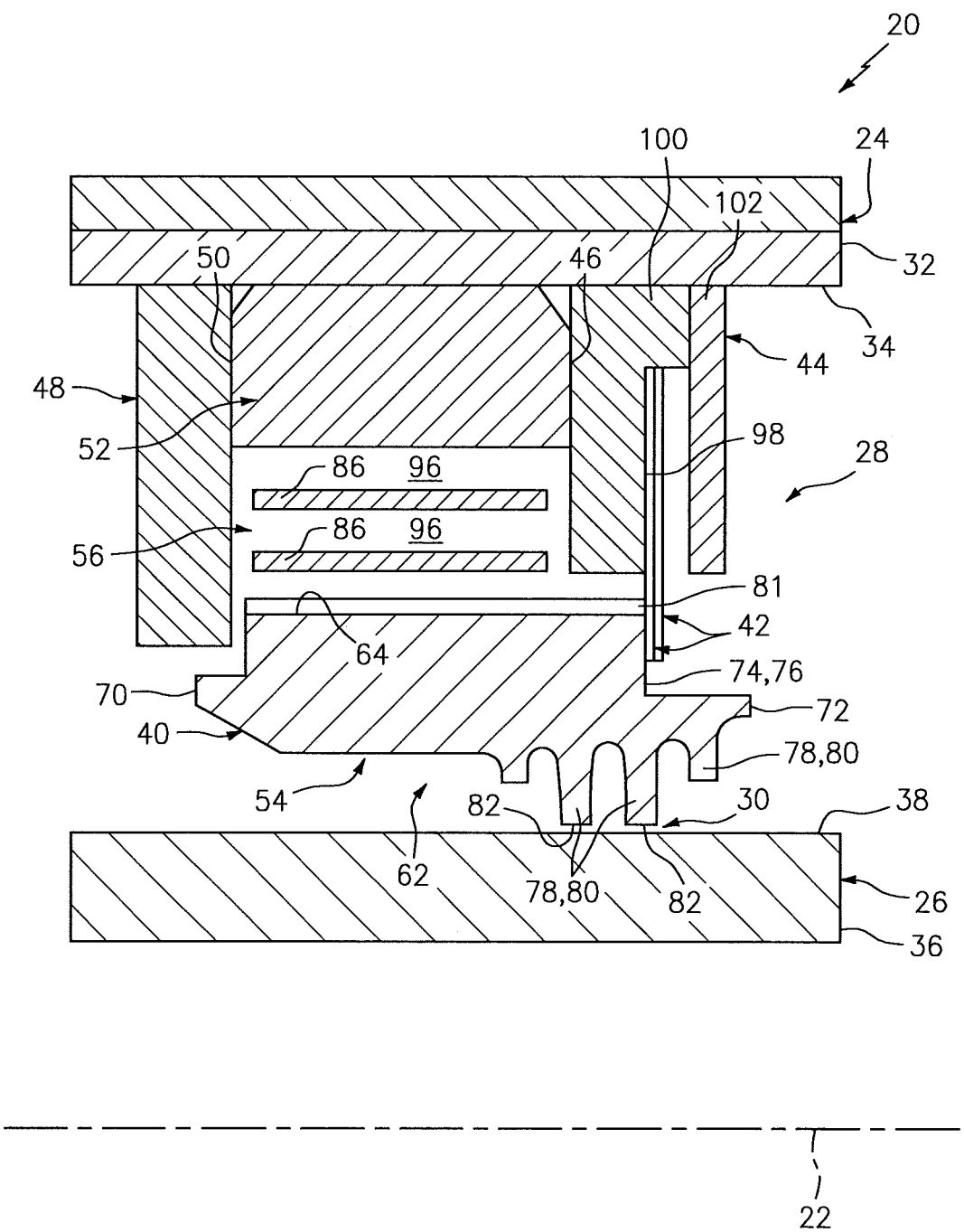
FIG. 1 is a top half side sectional illustration of an assembly for rotational equipment, such as for example a gas turbine engine.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine.

FIG. 1 illustrates an assembly 20 for rotational equipment with an axial centerline 22. An example of such rotational equipment is a gas turbine engine for an aircraft propulsion system, an exemplary embodiment of which is described below in further detail. However, the assembly 20 of the present disclosure is not limited to such an aircraft or gas turbine engine application. The assembly 20, for example, may alternatively be configured with rotational equipment such as an industrial gas turbine engine, a wind turbine, a water turbine, or any other apparatus in which a seal is provided between a stator structure and a rotor structure.

The assembly 20 of FIG. 1 includes a stator structure 24, a rotor structure 26 and a seal assembly 28. This seal assembly 28 is mounted with the stator structure 24, and configured to substantially seal an annular gap 30 between the stator structure 24 and the rotor structure 26 as described below in further detail.

The stator structure 24 includes a seal carrier 32. This seal carrier 32 may be a discrete, unitary annular body. Alternatively, the seal carrier 32 may be configured with another component/portion of the stator structure 24. The seal carrier 32 has an inner radial seal carrier surface 34. This seal carrier surface 34 may be substantially cylindrical, and extends circumferentially around and faces towards the axial centerline 22. The seal carrier surface 34 at least partially forms a bore in the stator structure 24. This bore is sized to receive the seal assembly 28, which may be fixedly attached to the seal carrier 32 by, for example, a press fit connection between the seal assembly 28 and the seal carrier surface 34.

The rotor structure 26 includes a seal land 36. This seal land 36 may be a discrete, unitary annular body. Alternatively, the seal land 36 may be configured with another component/portion of the rotor structure 26. The seal land 36 has an outer radial seal land surface 38. This seal land surface 38 may be substantially cylindrical, and extends circumferentially around and faces away from the axial centerline 22. The seal land surface 38 is disposed to face towards and is axially aligned with the seal carrier surface 34. While FIG. 1 illustrates the surfaces 34 and 38 with approximately equal axial lengths along the axial centerline 22, the seal land surface 38 may alternatively be longer or shorter than the seal carrier surface 34 in other embodiments.

The seal assembly 28 includes a primary seal device 40 and one or more secondary seal devices 42; e.g., 1, 2, 3 or more secondary seal devices 42. The seal assembly 28 also includes one or more additional components for positioning, supporting and/or mounting one or more of the seal devices 40 and 42 with the stator structure 24. The seal assembly 28 of FIG. 1, for example, includes a first ring structure 44 configured for positioning, supporting and/or mounting the secondary seal devices 42 relative to the primary seal device 40. This first ring structure 44 may also be configured for axially positioning and/or supporting a second end surface 46 of the primary seal device 40 relative to the stator structure 24. The seal assembly 28 of FIG. 1 also includes a second ring structure 48 (e.g., a scalloped support ring) configured for axially positioning and/or supporting a first end surface 50 of the primary seal device 40 relative to the stator structure 24. However, the second ring structure 48 may be omitted where, for example, the first end surface 50 of the primary seal device 40 may be abutted against another component/portion of the stator structure 24 (e.g., an annular or castellated shoulder) or otherwise axially positioned/secure with the stator structure 24.

The primary seal device 40 may be configured as an annular non-contact seal device and, more particularly, a hydrostatic non-contact seal device. An example of such a hydrostatic non-contact seal device is a Hydrostatic Adaptive Low Leakage ("HALO™") seal; however, the primary seal device 40 of the present disclosure is not limited to the foregoing exemplary hydrostatic non-contact seal device.

The primary seal device 40 includes a seal base 52, a plurality of seal shoes 54 and a plurality of spring elements 56. The seal base 52 is configured as an annular full hoop body, which extends circumferentially around the axial centerline 22. The seal base 52 is configured to circumscribe the seal shoes 54 as well as the spring elements 56. The seal base 52 extends axially along the axial centerline 22 between and forms the second end surface 46 and the first end surface 50. The seal base 52 extends radially between an inner radial base side 58 and an outer radial base side 60, which radially engages (e.g., is press fit against) the stator structure 24 and, more particularly, the seal carrier surface 34 (see FIG. 1).

Figure 2:
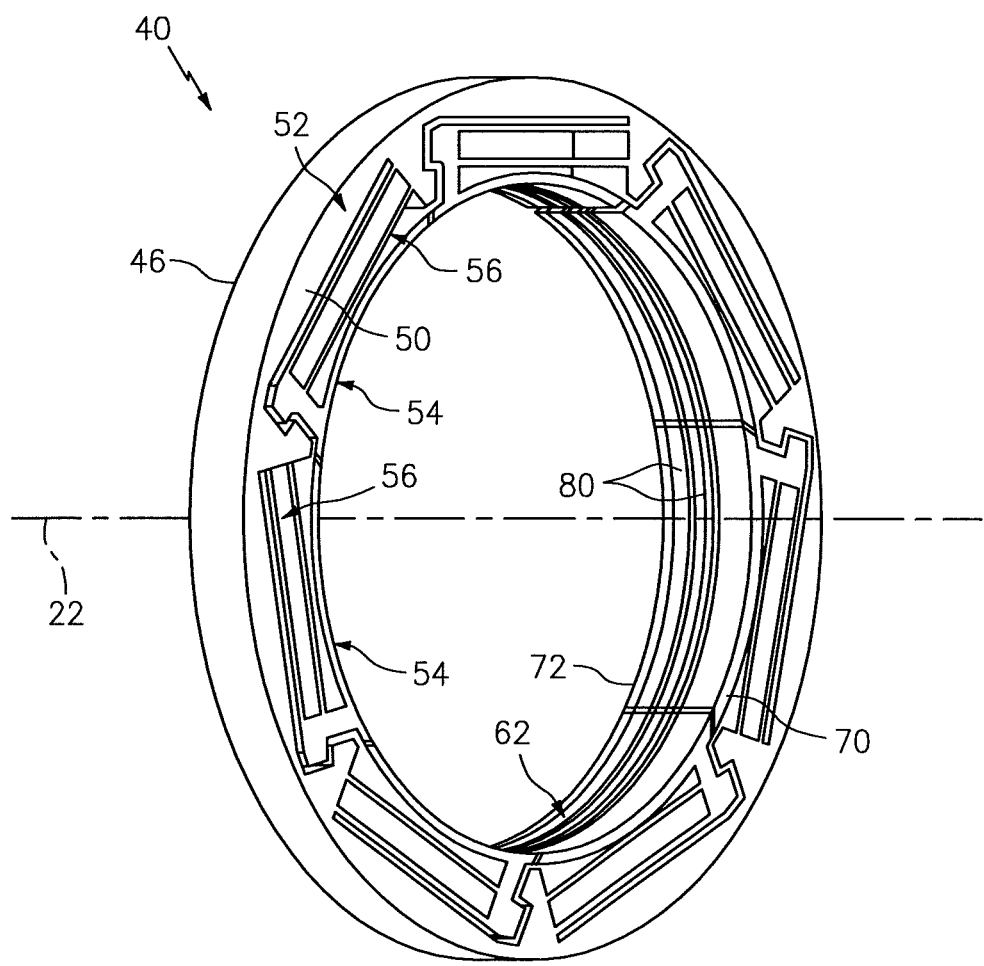
FIG. 2 is a simplified isometric illustration of a primary seal device for the assembly of FIG. 1.

Referring to FIG. 2, the seal shoes 54 are configured as arcuate bodies arranged circumferentially about the axial centerline 22 in an annular array. This annular array of the seal shoes 54 extends circumferentially around the axial centerline 22, thereby forming an inner bore at an inner radial side 62 of the primary seal device 40. As best seen in FIG. 1, the inner bore is sized to receive the seal land 36, where the rotor structure 26 projects axially through (or into) the inner bore formed by the seal shoes 54.

Figure 3:
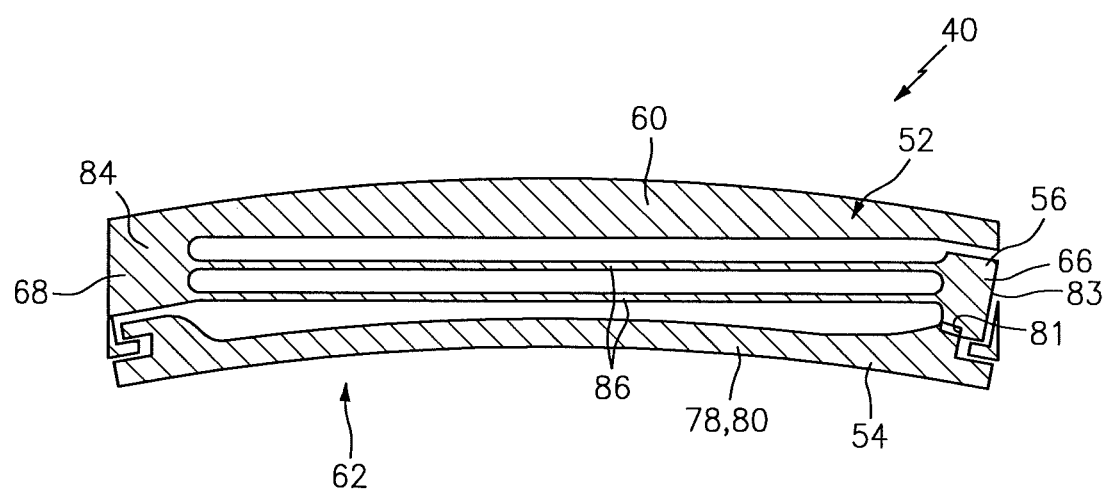
FIG. 3 is an illustration of a dual material hydrostatic non-contact seal.

Referring to FIGS. 1 and 3, each of the seal shoes 54 extends radially from the inner radial side 62 of the primary seal device 40 to an outer radial surface 64 of that seal shoe 54. Each of the seal shoes 54 extends circumferentially around the axial centerline 22 between opposing first and second circumferential sides 66 and 68 of that seal shoe 54.

Referring to FIG. 1, each of the seal shoes 54 extends axially along the axial centerline 22 between a first shoe end 70 and a second shoe end 72. The first shoe end 70 may be axially offset from and project axially away from the first end surface 50. The second shoe end 72 may be axially offset from and project axially away from the second end surface 46. The seal shoes 54 of the present disclosure, however, are not limited to such exemplary relationships.

Each of the seal shoes 54 may include an arcuate end surface 74 generally at (e.g., on, adjacent or proximate) the second shoe end 72. In the array (see FIG. 2), these arcuate end surfaces 74 collectively form a generally annular (but circumferentially segmented) end surface 76 configured for sealingly engaging with the secondary seal devices 42; see FIG. 1. The seal shoes 54 of the present disclosure, however, are not limited to the foregoing exemplary configuration.

Figure 4:
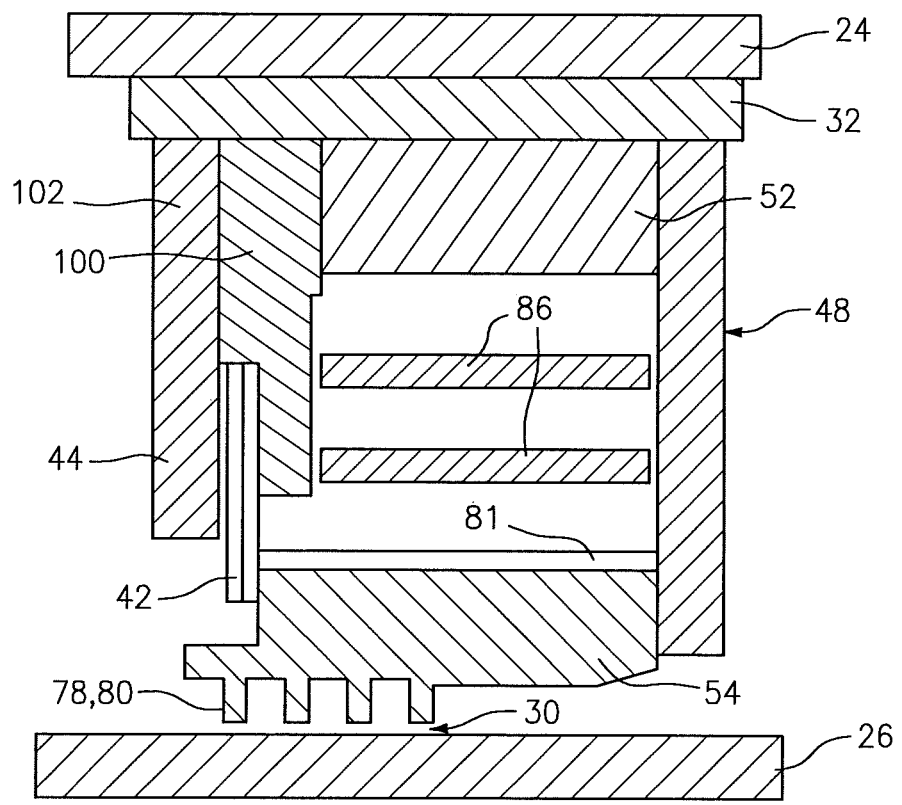
FIG. 4 is a simplified top half side sectional illustration of an assembly for rotational equipment that includes a first material for the seal outer ring and the beams, and a second material for the seal shoe.

Referring to FIGS. 1, 3 and 4, each of the seal shoes 54 includes one or more arcuate protrusions 78, which collectively form one or more (e.g., a plurality) of axially spaced generally annular (e.g., circumferentially segmented) ribs 80 at the inner radial side 62. Distal inner radial ends 82 of one or more of these ribs 80 are configured to be arranged in close proximity with (but not touch) and thereby sealingly engage the seal land surface 38 in a non-contact manner (see FIG. 1), where the rotor structure 26 project axially through (or into) the inner bore formed by the seal shoes 54. The ribs 80 therefore are configured, generally speaking, as non-contact knife edge seal elements.

Referring to FIG. 2, the spring elements 56 are arranged circumferentially about the axial centerline 22 in an annular array. Referring again to FIGS. 3 and 4, the spring elements 56 are also arranged radially between the seal shoes 54 and the seal base 52. Each of the spring elements 56 is configured to connect a respective one of the seal shoes 54 with the seal base 52. The spring element 56 shown in FIGS. 3 and 4, for example, includes one or more mounts 83 and 84 (e.g., generally radial fingers/projections) and one or more beams 86 (e.g., cantilever-leaf springs). The first mount 83 is connected to a respective one of the seal shoes 54 at (e.g., on, adjacent or proximate) the first circumferential side 66, where the opposing second circumferential side 68 of that seal shoe 54 is free floating. The second mount 84 is connected to the seal base 52, and is generally circumferentially aligned with or near the second circumferential side 68. The beams are radially stacked and spaced apart with one another. Each of these beams 86 extends laterally (e.g., tangentially or circumferentially) from the first mount 83 to the second mount 84. These spring elements 56 may thereby laterally overlap a major circumferential portion (e.g., ~65-95%) of the seal shoe 54. The spring elements 56 of the present disclosure, however, are not limited to the foregoing exemplary configuration or values.

During operation of the primary seal device 40, rotation of the rotor structure 26 may develop aerodynamic forces and apply a fluid pressure to the seal shoes 54 causing the each seal shoe 54 to respectively move radially relative to the seal land surface 38. The fluid velocity may increase as a gap between the seal shoe 54 and seal land surface 38 increases, thus reducing pressure in the gap and drawing the seal shoe 54 radially inwardly toward the seal land surface 38. As the gap closes, the velocity may decrease and the pressure may increase within the gap, thus, forcing the seal shoe 54 radially outwardly from the seal land surface 38. The respective spring element 56 may deflect and move with the seal shoe 54 to create a primary seal of the gap between the seal land surface 38 and ribs 80 within predetermined design tolerances.

As described above, the radial in and out movement of the seal shoes 54 is influenced by the rotational velocity of the rotor structure 26. Where the rotational velocity (w) of the rotor structure 26 has a frequency ($f=w\div 2\pi$) that is substantially equal to a natural frequency of the seal shoes 54, the seal shoes 54 may be subject to natural frequency excitation. Such excitation may result in one or more of the following:

- one or more of the seal shoes 54 and, more particularly, one or more of the ribs 80 to radially contact the seal land surface 38 thereby wearing to one or more of those components 36 and 54;
- relatively high stresses within one or more of the seal beams 86, which may result in high cycle fatigue failure of one or more of those seal beams 86; and
- increased leakage between one or more of the seal shoes 54 and the seal land surface 38 as a result of an uneven gap between those components 36 and 54.

The natural frequency of a seal shoe 54 is influenced by the mass of that seal shoe 54 and the stiffness of the spring elements 56 that attach seal shoe 54 to the seal base 52. Increasing the stiffness of the spring elements 56, for example, may increase the natural frequency of that seal shoe 54. Increasing the stiffness of the spring elements 56 may adversely affect their stress levels. In another example, decreasing the mass of the seal shoe 54 may increase the natural frequency of that seal shoe 54, without adversely impacting stress levels in the spring elements 56.

To further increase the natural frequency of the seal, the seal base 52 may be made of a material different than the seal shoe 54. FIG. 3 is an illustration of a hydrostatic non-contact seal of two different materials. FIG. 4 is a simplified top half side sectional illustration of an assembly for rotational equipment that includes a first material for the seal base/outer ring 52 and a second material for the seal shoe 54. The two materials may be joined together and heat treated as necessary before machining to obtain the final shape of the primary seal device 40. The first material used for the seal shoe 54 may have a high HCF stress and elastic properties, such as for example a nickel alloy. The second material for the seal base/outer ring 52 may be less dense than the first material. The lighter weight second material for the seal shoe 54 may include for example cobalt alloy or aluminum. Using a lower density for the second material in comparison to the first material allows a decrease in weight and an increase in frequency response of the seal shoe 54. The second material for the seal shoe 54 may also have improved wear properties or material characteristics that are favorable, while not adversely impacting the optimal behavior for the base/outer ring 52.

Referring still to FIGS. 3 and 4, the first material for the seal base/outer ring 52 and the second material for the seal shoe 54 may be joined together with a braze or weld 81.

Referring again to FIG. 1, while the primary seal device 40 is operable to generally seal the annular gap 30 between the stator structure 24 and the rotor structure 26 as described above, fluid (e.g., gas) may still flow axially through passages 96 defined by radial gaps between the components 52, 54 and 56. The secondary seal devices 42 therefore are provided to seal off these passages 96 and, thereby, further and more completely seal the annular gap 30.

Each of the secondary seal devices 42 may be configured as a ring seal element such as, but not limited to, a split ring. Alternatively, one or more of the secondary seal devices 42 may be configured as a full hoop body ring, an annular brush seal or any other suitable ring-type seal.

Figure 5:
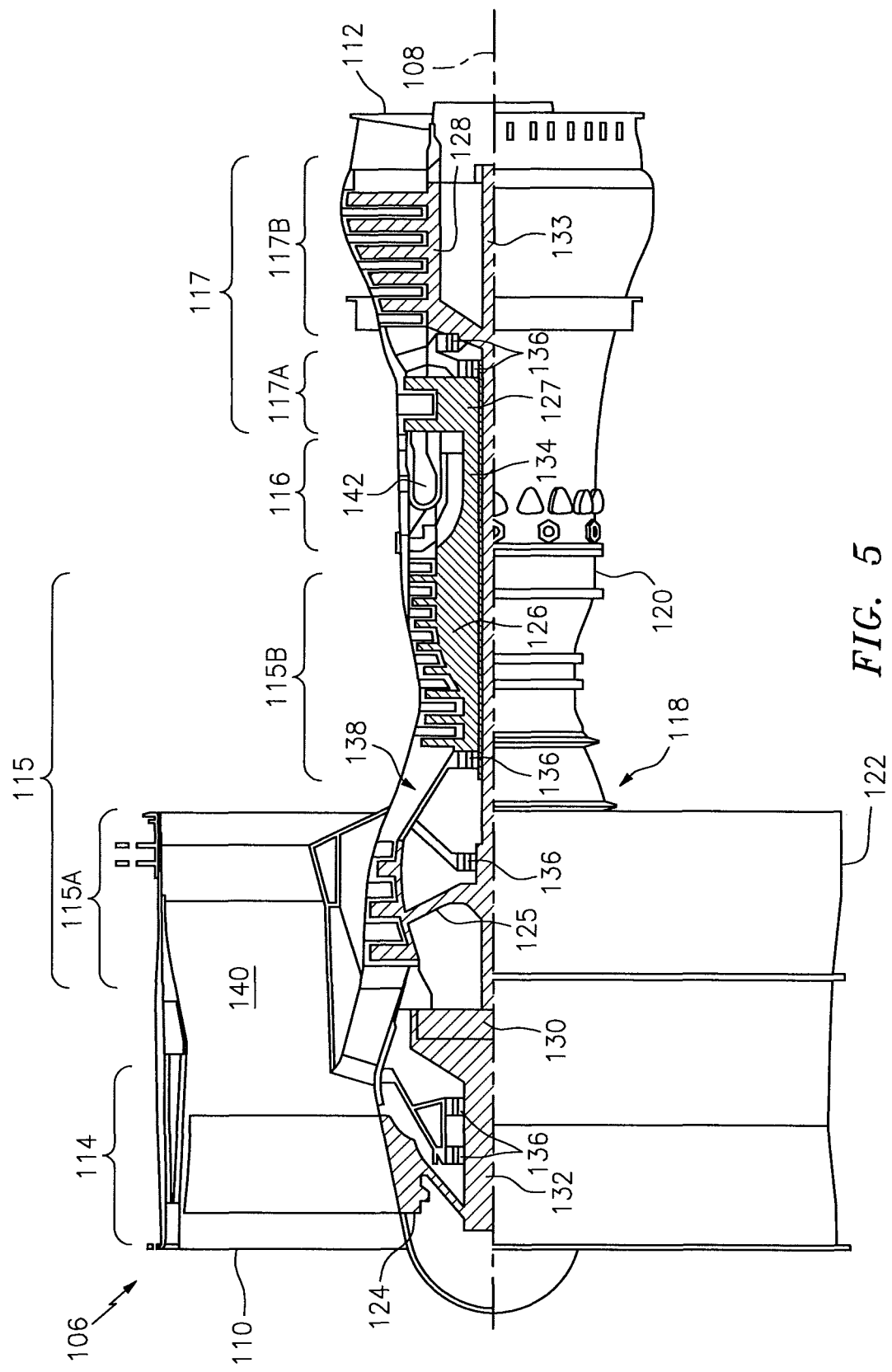
FIG. 5 is a side cutaway illustration of a gas turbine engine.

As described above, the assembly 20 of the present disclosure may be configured with various different types and configurations of rotational equipment. FIG. 5 illustrates one such type and configuration of the rotational equipment—a geared turbofan gas turbine engine 106. Such a turbine engine 106 includes various stator structures (e.g., bearing supports, hubs, cases, etc.) as well as various rotor structures (e.g., rotor disks, shafts, etc.) as described below, where the stator structure 24 and the rotor structure 26 can respectively be configured as anyone of the foregoing structures in the turbine engine 106 of FIG. 5, or other structures not mentioned herein.

Referring still to FIG. 5, the turbine engine 106 extends along an axial centerline 108 (e.g., the centerline 22) between an upstream airflow inlet 110 and a downstream airflow exhaust 112. The turbine engine 106 includes a fan section 114, a compressor section 115, a combustor section 116 and a turbine section 117. The compressor section 115 includes a low pressure compressor (LPC) section 115A and a high pressure compressor (HPC) section 115B. The turbine section 117 includes a high pressure turbine (HPT) section 117A and a low pressure turbine (LPT) section 117B.

The engine sections 114-117 are arranged sequentially along the centerline 108 within an engine housing 118, a portion or component of which may include or be connected to the stator structure 24. This housing 118 includes an inner case 120 (e.g., a core case) and an outer case 122 (e.g., a fan case). The inner case 120 may house one or more of the engine sections; e.g., an engine core. The outer case 122 may house at least the fan section 114.

Each of the engine sections 114, 115A, 115B, 117A and 117B includes a respective rotor 124-128. Each of these rotors 124-128 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 124 is connected to a gear train 130, for example, through a fan shaft 132. The gear train 130 and the LPC rotor 125 are connected to and driven by the LPT rotor 128 through a low speed shaft 133. The HPC rotor 126 is connected to and driven by the HPT rotor 127 through a high speed shaft 134. The shafts 132-134 are rotatably supported by a plurality of bearings 136; e.g., rolling element and/or thrust bearings. Each of these bearings 136 is connected to the engine housing 118 by at least one stationary structure such as, for example, an annular support strut.

During operation, air enters the turbine engine 106 through the airflow inlet 110. This air is directed through the fan section 114 and into a core gas path 138 and a bypass gas path 140. The core gas path 138 flows sequentially through the engine sections 115-117. The bypass gas path 140 flows away from the fan section 114 through a bypass duct, which circumscribes and bypasses the engine core. The air within the core gas path 138 may be referred to as "core air". The air within the bypass gas path 140 may be referred to as "bypass air".

The core air is compressed by the compressor rotors 125 and 126 and directed into a combustion chamber 142 of a combustor in the combustor section 116. Fuel is injected into the combustion chamber 142 and mixed with the compressed core air to provide a fuel-air mixture. This fuel air mixture is ignited and combustion products thereof flow through and sequentially cause the turbine rotors 127 and 128 to rotate. The rotation of the turbine rotors 127 and 128 respectively drive rotation of the compressor rotors 126 and 125 and, thus, compression of the air received from a core airflow inlet. The rotation of the turbine rotor 128 also drives rotation of the fan rotor 124, which propels bypass air through and out of the bypass gas path 140. The propulsion of the bypass air may account for a majority of thrust generated by the turbine engine 106, e.g., more than seventy-five percent (75%) of engine thrust. The turbine engine 106 of the present disclosure, however, is not limited to the foregoing exemplary thrust ratio.

The assembly 20 may be included in various aircraft and industrial turbine engines other than the one described above as well as in other types of rotational equipment; e.g., wind turbines, water turbines, rotary engines, etc. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 5), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While the assembly of the present disclosure has been disclosed primarily in a dual material embodiment, it is contemplated that more than two materials may be used to optimize various features of the assembly. In addition, although the materials have been disclosed as being joined together (e.g., by brazing or welding), it is contemplated that the assembly may also be manufactured using an additive manufacturing process.

While various embodiments of the present invention have been disclosed, it will be apparent to those of ordinary skill in the art that many more embodiments and implementations are possible within the scope of the invention. For example, the embodiments of the present invention as described herein include several aspects and embodiments that include particular features. Although these features may be described individually, it is within the scope of the embodiments of the present invention that some or all of these features may be combined with any one of the aspects and remain within the scope of the invention. Accordingly, the present invention is not to be restricted except in light of the attached claims and their equivalents.

What is claimed is:

1. A non-contact seal assembly, comprising:
   a plurality of seal shoes arranged about a centerline in an annular array, the seal shoes including a first seal shoe extending axially along the centerline between a first shoe end and a second shoe end;
   a seal base circumscribing the annular array of the seal shoes; and
   a plurality of spring elements, each of the spring elements radially between and connecting a respective one of the seal shoes with the seal base,
   where the seal base and the plurality of spring elements are formed of a first material and the plurality of seal shoes are formed of a second material, where the first and second materials are joined together at an interface between the respective one of the seal shoes and the plurality of spring elements, and where the second material has a density lower than the first material.

2. The non-contact seal assembly of claim 1, where the first material and the second material are joined by a braze.

3. The non-contact seal assembly of claim 1, where the first material and the second material are joined by a weld.

4. The non-contact seal assembly of claim 1, where the first material comprises nickel alloy.

5. The non-contact assembly of claim 1, where the second material comprises one of cobalt alloy or aluminum.

6. The non-contact assembly of claim 4, where the second material comprises one of cobalt alloy or aluminum.

7. The non-contact seal assembly of claim 1, where the first seal shoe extends circumferentially, at the first shoe end, between a first shoe side and a second shoe side for a seal shoe length.

8. The non-contact seal assembly of claim 1, where the seal shoes collectively form a substantially annular end surface at the second shoe end.

9. A non-contact seal assembly, comprising:
a plurality of seal shoes arranged about a centerline in an annular array, the seal shoes including a first seal shoe extending axially along the centerline between a first shoe end and a second shoe end;
a seal base circumscribing the annular array of the seal shoes; and
a plurality of spring elements, each of the spring elements radially between and connecting a respective one of the seal shoes with the seal base,
where the seal base and the plurality of spring elements are formed of a first material and the plurality of seal shoes are formed of a second material, where the first and second materials are joined together at an interface between the respective one of the seal shoes and the plurality of spring elements, and where the first and second materials are different metallic materials.

10. The non-contact seal assembly of claim 9, where the first material and the second material are joined by a braze.

11. The non-contact seal assembly of claim 9, where the first material and the second material are joined by a weld.

12. The non-contact seal assembly of claim 9, where the first material comprises nickel alloy.

13. The non-contact assembly of claim 9, where the second material comprises one of cobalt alloy or aluminum.

14. The non-contact assembly of claim 12, where the second material comprises one of cobalt alloy or aluminum.

15. An assembly for rotational equipment with an axial centerline, the assembly comprising:
a stator structure;
a rotor structure; and
a seal assembly configured to substantially seal an annular gap between the stator structure and the rotor structure, the seal assembly comprising a hydrostatic non-contact seal device including a plurality of seal shoes, a seal base and a plurality of spring elements;
the seal shoes arranged about a centerline in an annular array, the seal shoes sealingly engaging the rotor structure and including a first seal shoe extending axially along the centerline between a first shoe end and a second shoe end;
the seal base circumscribing the annular array of the seal shoes, the seal base mounted with the stator structure; and
where the seal base and the plurality of spring elements are formed of a first material and the plurality of seal shoes are formed of a second material, where the first and second materials are joined together at an interface between the seal shoes and the plurality of spring elements, and where the first and second materials are different materials.

16. The assembly of claim 15, where the first material and the second material are joined by a braze.

17. The assembly of claim 15, where the first material and the second material are joined by a weld.

18. The assembly of claim 15, where the first material comprises nickel alloy.

19. The assembly of claim 15, where the second material comprises one of cobalt alloy or aluminum.

20. The assembly of claim 18, where the second material comprises one of cobalt alloy or aluminum.

* * * * *